United States Patent [19]

Ward

[11] Patent Number: 4,672,284
[45] Date of Patent: Jun. 9, 1987

[54] PERMANENT SPLIT-PHASE CAPACITOR INDUCTION MOTOR

[75] Inventor: Philip A. Ward, Cheshire, England

[73] Assignee: Associated Electrical Industries Limited, England

[21] Appl. No.: 785,487

[22] Filed: Oct. 8, 1985

[30] Foreign Application Priority Data

Oct. 19, 1984 [GB] United Kingdom ............... 8426496

[51] Int. Cl.$^4$ .............................................. H02P 3/18
[52] U.S. Cl. .................................... 318/752; 318/781; 318/817
[58] Field of Search ............... 318/729, 731, 732, 749, 318/751, 752, 778, 781, 816–820

[56] References Cited

U.S. PATENT DOCUMENTS

| | | | |
|---|---|---|---|
| 4,271,386 | 6/1981 | Lee | 318/729 |
| 4,382,217 | 5/1983 | Horner et al. | 318/778 |
| 4,409,528 | 10/1983 | Podell | 318/729 X |
| 4,409,532 | 10/1983 | Hollenbeck et al. | 318/749 |
| 4,496,895 | 1/1985 | Kawate et al. | 318/781 |
| 4,520,303 | 5/1985 | Ward | 318/778 |

FOREIGN PATENT DOCUMENTS

| | | |
|---|---|---|
| 1358396 | 7/1974 | United Kingdom . |
| 2082855 | 3/1982 | United Kingdom . |
| 2107139 | 4/1983 | United Kingdom . |
| 2117581 | 10/1983 | United Kingdom . |

*Primary Examiner*—Peter S. Wong
*Assistant Examiner*—Marc S. Hoff
*Attorney, Agent, or Firm*—Kirschstein, Kirschstein, Ottinger & Israel

[57] ABSTRACT

A permanent split-phase capacitor induction motor having a capacitor (7) connected in series with an auxiliary winding (5) via an electronic switch (9) which is operated by a control circuit (11, 13) so as to obtain a higher starting torque than if the switch were permanently closed.

The control circuit suitably comprises an integrating (21 to 31) responsive to the voltage appearing across the switch (9) and trigger circuit (19) which closes the switch when the output of the integrating circuit exceeds a threshold value, the integrating circuit resetting when the switch closes, and the switch reopening at the next current zero.

12 Claims, 4 Drawing Figures

4,672,284

PERMANENT SPLIT-PHASE CAPACITOR INDUCTION MOTOR

BACKGROUND OF THE INVENTION

1. Field of the Invention

This invention relates to single phase induction motors.

2. Description of Related Art

More particularly the invention relates to so-called permanent split-phase capacitor induction motors, that is to say, single phase induction motors of the kind having, in addition to a main stator winding, an auxiliary stator winding which is connected to the mains supply via a capacitor so that the motor operates as a quasi two-phase motor, and of course is self-starting. In such a motor the value of the capacitor is frequently chosen to cause the required 90° phase difference between main and auxiliary winding currents when the motor operates at or near full load to obtain maximum output, and the penalty for this is a low starting torque. To overcome this problem some such motors have a second capacitor which is switched in at low speeds only, this type of motor being referred to as a capacitor start/capacitor run motor.

SUMMARY OF THE INVENTION

It is an object of the present invention to provide a permanent split-phase capacitor induction motor wherein an alternative solution to the provision of a second capacitor switched in at low speeds is utilised to overcome the problem of low starting torque.

According to the present invention a permanent split-phase capacitor induction motor comprises: a first stator winding for energisation from a single-phase supply; a second stator winding arranged for energisation from said supply via a first capacitance and an electronic switching means; and control means arranged to control the operation of said switch means so as to produce a higher starting torque in the motor than if the switch means were permanently closed.

Where said switch means is of the kind which after being triggered into conduction remains conducting until the current through it approaches zero, said control means suitably comprises integrating means responsive to the voltage appearing across the switch means, and means operative to trigger said switch means in response to the output of the integrating means exceeding a predetermined threshold value, the integrating means resetting when the switch means becomes conducting.

In a motor according to the invention said switch means is suitably arranged to be permanently closed when the motor is running at substantially normally full speed.

BRIEF DESCRIPTION OF THE DRAWINGS

One induction motor in accordance with the invention will now be described by way of example with reference to the accompanying drawings in which.

DETAILED DESCRIPTION OF THE PREFERRED EMBODIMENTS

Figure 1:
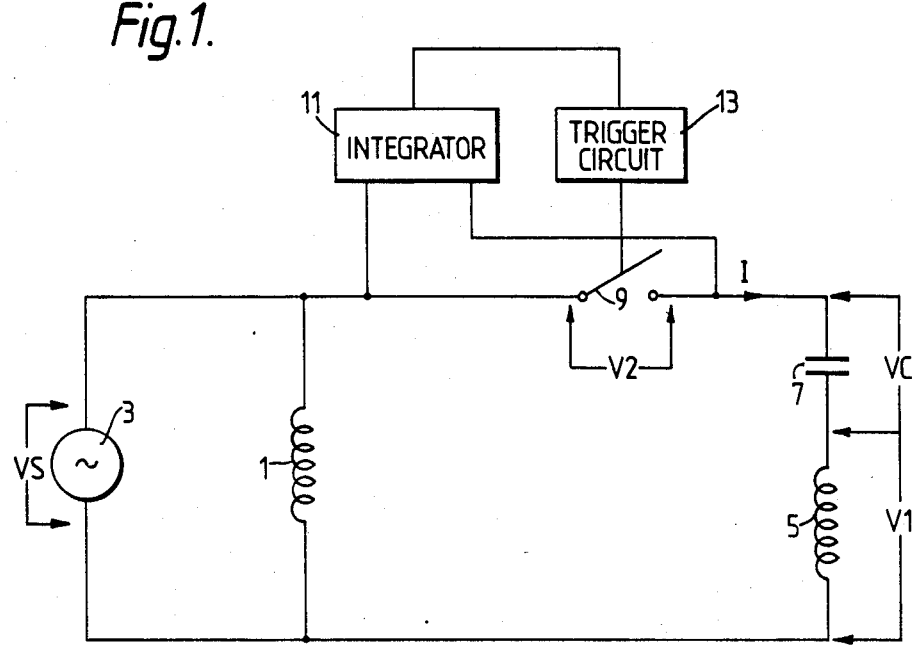
FIG. 1 is a block schematic diagram of the motor.

Referring to FIG. 1, the motor includes a main stator winding 1 arranged for energisation from an alternating current supply 3.

The stator is also provided with an auxiliary winding 5 connected in series with a capacitor 7 and an electronic switch 9 across the supply 3.

The switch 9 is operated by a control circuit comprising an integrator 11 which integrates the voltage appearing across the switch 9, and a trigger circuit 13 which applies a trigger pulse to the switch 9 to render the switch conductive, when the output voltage of the integrator exceeds a predetermined threshold level VT.

The switch 9 is of the kind which after being triggered into conduction, remains conducting until the current through it falls approximately to zero.

Figure 2:
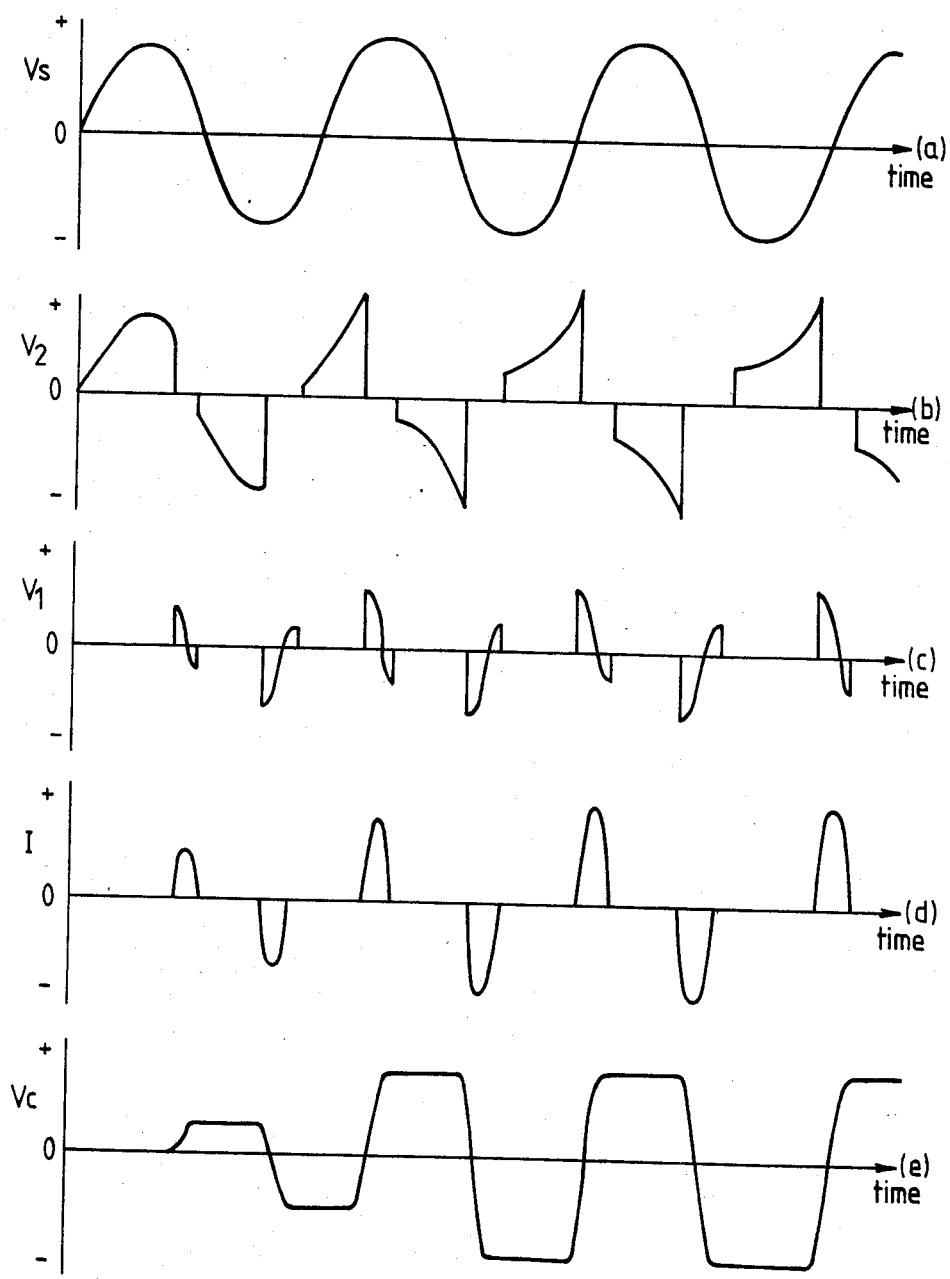
FIG. 2 shows various waveforms illustrating the operation of the motor of FIG. 1.

Referring now also to FIG. 2, in operation of the motor, when the supply is switched on with the motor rotor stationary, the switch 9 is open, the voltage VC (FIG. 2e) across the capacitor 7 is zero and the supply voltage VS (FIG. 2a) constitutes the input voltage V2 (FIG. 2b) of the integrator 11. The output of the integrator 11 then starts to rise until fairly late in the first half cycle of the supply volts when it reaches the threshold value VT whereupon the switch 9 becomes conducting i.e. closes. As a result a current I (FIG. 2d) of a magnitude determined by the supply volts flows in the auxiliary winding 5 via capacitor 7 and a corresponding voltage V1 (FIG. 2c) appears across the winding 5. The frequency of the current I and of the voltage V1, being determined by the frequency at which capacitor 7 resonates with winding 5, is higher than the supply frequency so that the current I soon falls to zero and the switch 9 stops conducting i.e. re-opens.

During the time that the switch 9 is closed the capacitor 7 charges in opposition to the supply voltage and the integrator 11 resets. Hence, in the second half cycle of the supply voltage when the switch 9 has re-opened, the voltage V2 appearing across the input to the integrator 11 is the sum of the voltage VC across the capacitor 7 and the supply volts VS causing the output voltage of the integrator 11 to reach the threshold value VT earlier than in the first half cycle. When the threshold voltage VT is reached the switch 9 again closes and the capacitor 7 discharges through the auxiliary winding 5 and recharges with opposite polarity from the supply 3 causing the resulting pulse of current which flows in the winding 5 to be larger, as well as earlier, than during the first period when the switch 9 was closed.

When the switch 9 opens again the capacitor 7 is charged to a higher voltage than at the end of the first period when the switch 9 was closed, and when the switch 9 next closes, earlier than in the preceding supply voltage half cycle, an even larger pulse of current I flows in the winding 5. After a few further half cycles the operation stabilises with current pulses I occurring in each half cycle of the supply volts VS well before the peak of the half cycle, thus giving the required phase advance of current in the auxiliary winding 5 with respect to current in the main winding 1 to achieve good starting torque. It will be appreciated in this connection that the current in the main winding 1 slightly lags the supply volts VS due to the main winding inductance.

If the switch 9 were permanently closed during starting the current in the auxiliary winding 5 would be more nearly in phase with the main winding current giving a relatively low starting torque, the value of the capacitor 7 being chosen to produce the required 90° phase difference between the main and auxiliary winding currents when the motor is running at normal full speed and the effective inductance of the auxiliary winding is smaller than when the rotor is stationary.

When the motor of FIG. 1 has run up to speed, the switch 9 may advantageously be arranged to be permanently closed to reduce heating of the switch 9.

Figure 3:
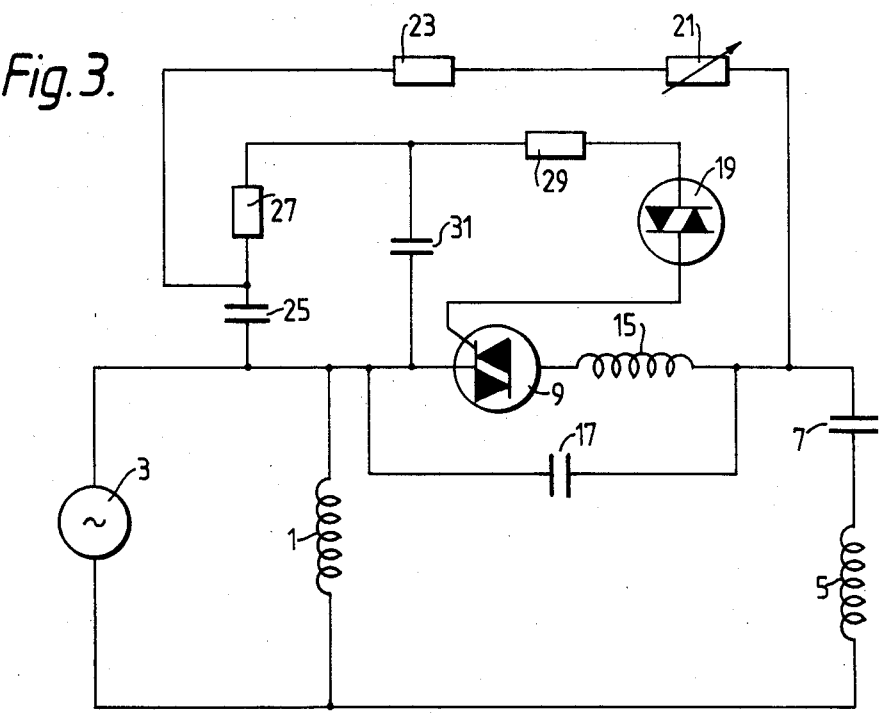
FIG. 3 is a circuit diagram of one motor of the general form shown in FIG. 1.

Referring to FIG. 3, in one particular motor of the general form illustrated in FIG. 1 the electronic switch 9 is a triac which is connected in series with a small valued inductor 15 with a capacitor 17 connected in parallel with the series connection of the triac 9 and inductor 15 to protect the triac against switching transients in known manner.

The trigger circuit comprises a diac 19, or other semiconductor breakdown device, having a breakdown voltage approximately equal to the threshold voltage VT, connected in the trigger electrode lead of the triac 9. The integrator 11 comprises two resistors 21 and 23 connected in series with a capacitor 25 across the series connection of the triac 9 and the inductor 15, the resistor 21 being made variable to allow adjustment of the integrator. The integrator further includes resistor 27 and a resistor 29 connected in series between the junction between the capacitor 25 and the resistor 23 and the diac 19, and a capacitor 31 connected across the series connection of the resistor 27 and the capacitor 25. The resistor 29 serves to limit the discharge current of the capacitor 25 when the diac 19 breaks down.

Figure 4:
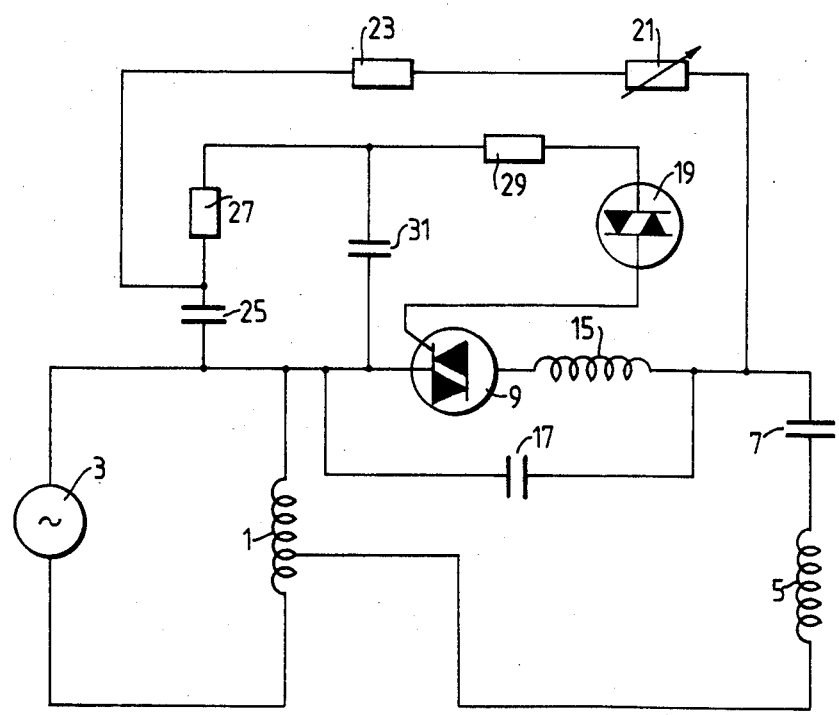
FIG. 4 is a circuit diagram of a modification of the circuit shown in FIG. 3.

In one particular embodiment of the motor shown in FIG. 3 for use with a 240 volts 50 Hz supply, suitable values for the components of the integrator are as follows:

Resistor 21: 330 kilohms
Resistor 23: 1 kilohm
Resistor 27: 10 kilohms
Resistor 29: 100 kilohms
Capacitor 17: 0.22 microfarad
Capacitor 25: 0.1 microfarad
Capacitor 31: 0.022 microfarad In a modification of the motor shown in FIG. 4, the inductor 15, triac 9, capacitor 7 and auxiliary winding 5 are connected in series across a part only of the main winding 1, instead of across the whole winding 1, i.e. directly across the supply 3, as shown in FIG. 4.

I claim:

1. A permanent split-phase capacitor induction motor comprising: a first stator winding for energization from a single-phase supply; a second stator winding; a capacitance and an electronic switch means connected in series with said second stator winding across said supply; and control means for controlling the operation of said switch means so that said second stator winding is energized from said supply via said capacitor and said switching means both during starting and during running of the motor, so that during starting a higher torque is produced in the motor than if the switch means were permanently closed.

2. A motor according to claim 1 wherein said control means comprises means for controlling the operation of said switch means so that when the motor is stationary said switch means is closed during such a portion of each half cycle of the supply that the current in said second stator winding leads the current in said first stator winding by a greater amount than if said switch means were permanently closed.

3. A motor according to claim 2 wherein said portion is a period starting substantially at a time when the integral of the voltage appearing across the switch means since the switch means last opened exceeds a predetermined threshold value.

4. A motor according to claim 1 wherein said switch means is of the kind which after being triggered into conduction remains conducting until the current through it approaches zero, and said control means comprises integrating means responsive to the voltage appearing across the switch means, and means operative to trigger said switch means in response to the output of the integrating means exceeding a predetermined threshold value, the integrating means resetting when the switch means becomes conducting.

5. A motor according to claim 4 wherein said switch means comprises a semiconductor switching device connected in series with a first inductance, and a further capacitance connected in parallel with the series connection of said switching device and first inductance.

6. A motor according to claim 5 wherein said switching device comprises a triac.

7. A motor according to claim 4 wherein said means operative to trigger said switch means comprises a semiconductor breakdown device.

8. A motor according to claim 7 wherein said integrating means comprises a second capacitance and a first resistance connected in series across said switch means, and said breakdown device is connected between the junction of said second capacitance and said first resistance and a control electrode of said switch means.

9. A motor according to claim 8 wherein said integrating means further includes a second resistance connected between said junction and said breakdown device and a third capacitance connected across the series connection of said second resistance and said second capacitance.

10. A motor according to claim 8 wherein said first resistance is variable.

11. A motor according to claim 1 wherein said second stator winding, said capacitance, and said switching means are connected in series across a part of said first stator winding.

12. A motor according to claim 1 wherein said control means includes means for permanently closing said switch means when the motor is running at substantially normal full speed.

* * * * *